Oct. 28, 1969          L. S. SAIIA                3,475,088
                    AUDIO-VISUAL SYSTEM
Filed March 14, 1967                        2 Sheets-Sheet 1

INVENTOR.
LOUIS S. SAIIA
BY
Robert Mednick
ATTORNEY

Oct. 28, 1969          L. S. SAIIA          3,475,088

AUDIO-VISUAL SYSTEM

Filed March 14, 1967          2 Sheets-Sheet 2

INVENTOR.
LOUIS S. SAIIA
BY
ATTORNEY

United States Patent Office 3,475,088
Patented Oct. 28, 1969

3,475,088
AUDIO-VISUAL SYSTEM
Louis S. Saiia, 720 Henrietta Ave.,
Sunnyvale, Calif. 94086
Filed Mar. 14, 1967, Ser. No. 622,952
Int. Cl. G03b 21/32
U.S. Cl. 352—133                                7 Claims

ABSTRACT OF THE DISCLOSURE

An audio-visual system including an audio reproducing device, a pair of visual reproducing devices, switch means, and a visual sequence controller, said visual sequence controller having a program member, a light source, driving means to move the program member, and a switch actuator circuit, and said visual sequence controller being responsive to light passing through apertures in the program member to actuate said switch means to automatically correlate the operation of the audio reproducing device with the visual reproducing devices.

---

The present invention relates to an audio-visual system, and more particularly relates to an audio-visual system for instructional purposes that is programmed to be automatically repeated.

A skilled instructor is able to present ideas, develop concepts, and teach subjects in a manner to give direction to and to speed up the learning process. The organization or programming of a teaching session involves a lot of time for preparation, planning, evaluation, and subsequent modification. Instructors may utilize audio and visual aids in a class, group, or meeting to assist in explaining, describing, dramatizing, or otherwise presenting the subject matter. It is often required to utilize one or more of such aids, such as tape recorders, slides, moving pictures, or filmstrips in a single teaching program. When an effective teaching program is developed, it is desirable to be able to automatically repeat the teaching program without taking up the time of the particular instructor who developed it.

It is therefore an object of this invention to provide an audio-visual system for instructional purposes.

Another object of this invention is to provide an audio-visual system in which an audio reproducing device is used in conjunction with one or more visual reproducing devices operating in a predetermined sequence.

Still another object of this invention is to provide an audio-visual system in which the sequence of operation of the visual devices may be quickly and easily arranged for repetition thereof.

A further object of this invention is to provide an audio-visual system in which the visual aid devices are automatically operated in a predetermined sequence in synchronization with an audio reproducing device.

A still further object of this invention is to provide an audio-visual system in which different and readily available audio and visual devices may be combined in any desired program for automatic presentation.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Figure 1:
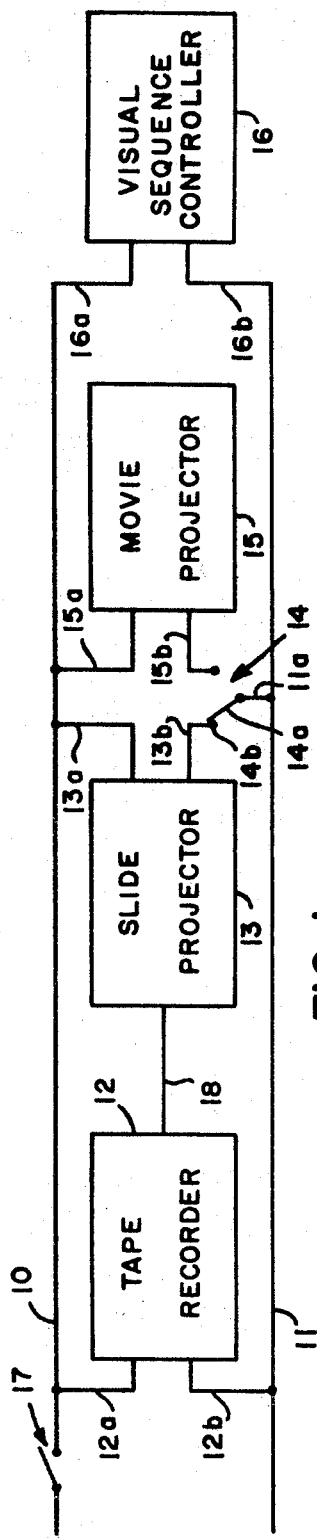
FIG. 1 is a block diagram of an audio-visual system incorporating the present invention.

Referring now to the figures, there is seen in FIG. 1 a block diagram of the audio-visual system of this invention. Power lines 10 and 11 are connectable to an A.C. power source of about 117 volts alternating current. A tape recorder 12 is electrically connected to power lines 10 and 11 by lines 12a and 12b; a slide projector 13 is electrically connected to power line 10 by line 13a, and is electrically connected to power line 11 by line 13b, through switch 14, and by line 11a; and a movie projector 15 is electrically connected to power line 10 by line 15a, and is electrically connectable to power line 11 by line 15b, through switch 14, and by line 11a. Movable arm 14a of switch 14 can be actuated as hereinafter described to connect to line 15b. A visual sequence controller 16 is electrically connected to power lines 10 and 11 by lines 16a and 16b. A main switch 17 is provided in line 10 to enable tape recorder 12, slide projector 13, movie projector 15, and visual sequence controller 16 to be simultaneously energized by the A.C. power source.

Tape recorder 12 is a dual track magnetic recording and reproducing device in which two magnetic heads can separately record and reproduce signals on a magnetic tape. One of its magnetic heads is used to record and reproduce an instructor's oral lecture on one track of the magnetic tape, whereas the other magnetic head is used to record and reproduce slide changing signals to be applied to slide projector 13 via line 18. Slide projector 13 is a device for projecting a visual image on a screen (not shown) from individually prepared photographic slides. A filmstrip projector or other still picture reproducing equipment may be substituted for slide projector 13. The slide changing signals received by line 18 enables slide projector 13 to automatically advance its slide mechanism to project the next in order of the series of still picture slides stored in its slide mechanism. Movie projector 15 is a device for projecting a continuous series of still pictures to form a visually apparent moving picture. Movie projector 15 is positioned to project its moving picture on the same screen used for slide projector 13. Tape recorder 12, slide projector 13, and movie projector 15 may be of the types that are commercially available to perform such operations. Herein, tape recorder 12 is the audio reproducing device, slide projector 13 and movie projector 15 are the visual reproducing devices, and switch 14 is the switch means connected to the visual reproducing devices.

Figure 2:
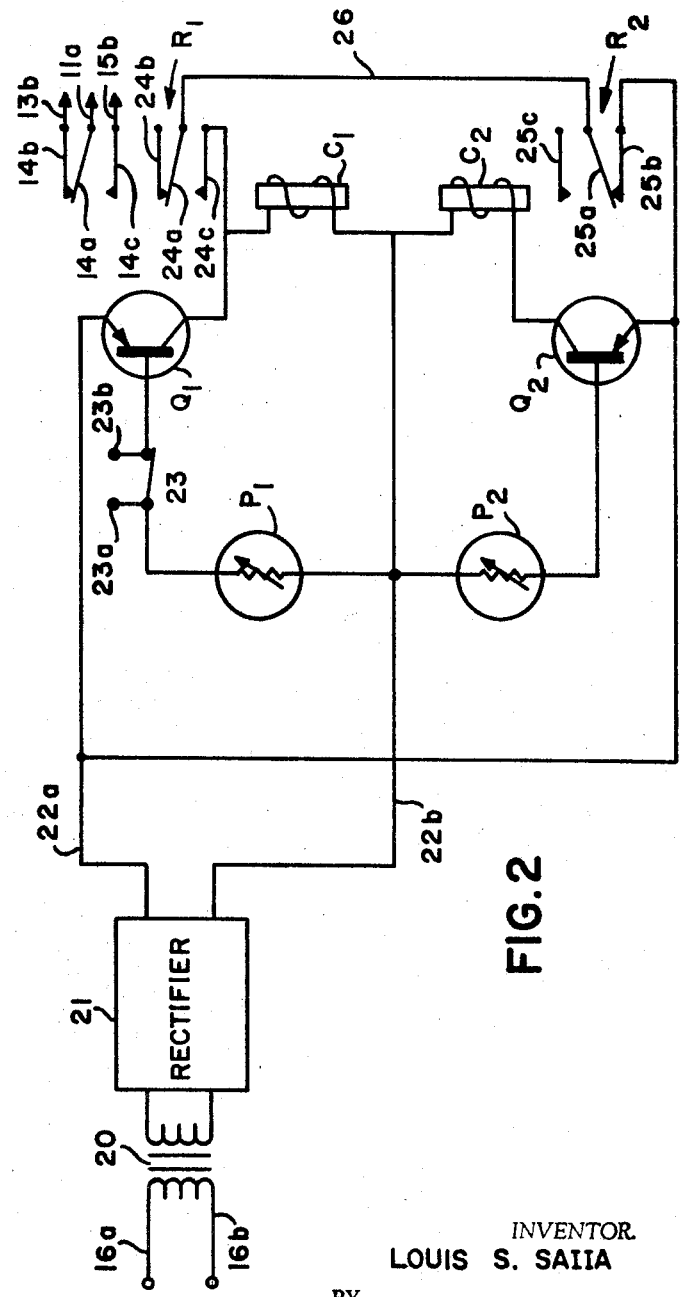
FIG. 2 is a schematic circuit diagram of a switch actuator circuit utilized in the visual sequence controller shown in FIG. 1.

Referring now to FIG. 2, there is seen a schematic circuit diagram of switch actuator circuit utilized in visual sequence controller 16 seen in FIG. 1. Lines 16a and 16b connect the power transformer 20 which in turn is connected to rectifier 21. Transformer 20 and rectifier 21 reduce the voltage and rectify the alternating current to provide a suitable D.C. voltage (e.g. about 20 volts) to lines 22a and 22b. The emitters of transistors $Q_1$ and $Q_2$ are both connected to line 22a. The collector of transistor $Q_1$ connects to line 22b through coil $C_1$ of relay $R_1$, and the collector of transistor $Q_2$ connects to line 22b through coil $C_2$ of relay $R_2$. The base of transistor $Q_1$ connects to line 22b through shorting switch 23 and photocell $P_1$, and the base of transistor $Q_2$ connects to line 22b through photocell $P_2$. As transistors $Q_1$ and $Q_2$ are shown to be PNP type transistors, the D.C. voltage on line 22a is positive and that of line 22b is negative.

Movable arm 24a of relay $R_1$, which normally engages contact member 24b, will move to engage contact member 24c when coil $C_1$ of relay $R_1$ is energized to do so by current flow therethrough. In addition, movable arm 25a of relay $R_1$ which normally engages contact member 25b, will move to engage contact member 25c, when coil $C_2$ of relay $R_2$ is energized to do so by current flow therethrough. Movable arm 24a of relay $R_1$ is connected to movable arm 25a of relay $R_2$ by line 26. Contact member 24c of relay $R_1$ is connected to the collector of transistor $Q_1$, and contact member 25b of relay $R_2$ is connected to line 22a.

Switch 14 is also seen in FIG. 2 to include a movable arm 14a, a contact member 14b, and another contact member 14c. Switch 14 is also actuable by coil $C_1$ of relay $R_1$ to move movable arm 14a to engage contact member 14c. Movable arm 14a is seen to engage contact member 14b which connects to slide projector 13 by line 13b. When coil $C_1$ of relay $R_1$ is energized, movable arm 14a will move to engage contact member 14c which connects to movie projector 15 by line 15b.

When light is not received by photocell $P_1$, its electrical resistance is high (e.g. about one megohm). On the other hand, when light is applied to photocell $P_1$, its electrical resistance reduces substantially (e.g. to about 2,000 ohms). If the electrical resistance of $P_1$ is high, the base current and hence also the emitter current of transistor $Q_1$ are both negligible so that coil $C_1$ of relay $R_1$ is not energized to enable it to move movable arm 24a away from contact member 24b. However, when light is directed on photocell $P_1$ to reduce its resistance and thereby increase the base current of transistor $Q_1$, sufficient emitter current will flow to energize coil $C_1$ of relay $R_1$ to pull movable arm 24a to engage contact member 24c. Transistor $Q_2$, coil $C_1$, and photocell $P_2$ are seen to be connected to operate in the same manner as above described. When light is directed at photocell $P_2$, transistor $Q_2$ will conduct to energize coil $C_2$ of relay $R_2$ to pull movable arm 25a to engage contact member 25c.

It will be noted that when light is momentarily applied to photocell $P_1$, coil $C_1$ of relay $R_1$ is energized to pull movable arm 24a to engage contact member 24c. At that time, coil $C_1$ of relay $R_1$, which is directly connected to line 22b, is also connected to line 22a by movable arm 24a engaging contact member 24c, by line 26, and by movable arm 25a engaging contact member 25b. The voltage on lines 22a and 22b will then continue to be applied across coil $C_1$ of relay $R_1$. Accordingly, even if the light is not continuously applied to photocell $P_1$, coil $C_1$ will then still remain energized until the positive voltage on line 22a is removed therefrom. However, when light is applied to photocell $P_2$, coil $C_2$ of relay $R_2$ is energized to pull movable arm 25a away from contact member 25b thereby disconnecting the positive voltage on line 22a from coil $C_1$ of relay $R_1$. With said positive voltage removed from coil $C_1$, its movable arm 24a will return to engage contact member 24b and remain in this position until coil $C_1$ is again energized as a result of light being applied to photocell $P_1$. As switch 14 is also actuated by coil $C_1$ of relay $R_1$, the movement of its movable arm 14a will be identical to that of movable arm 24a.

Figure 3:
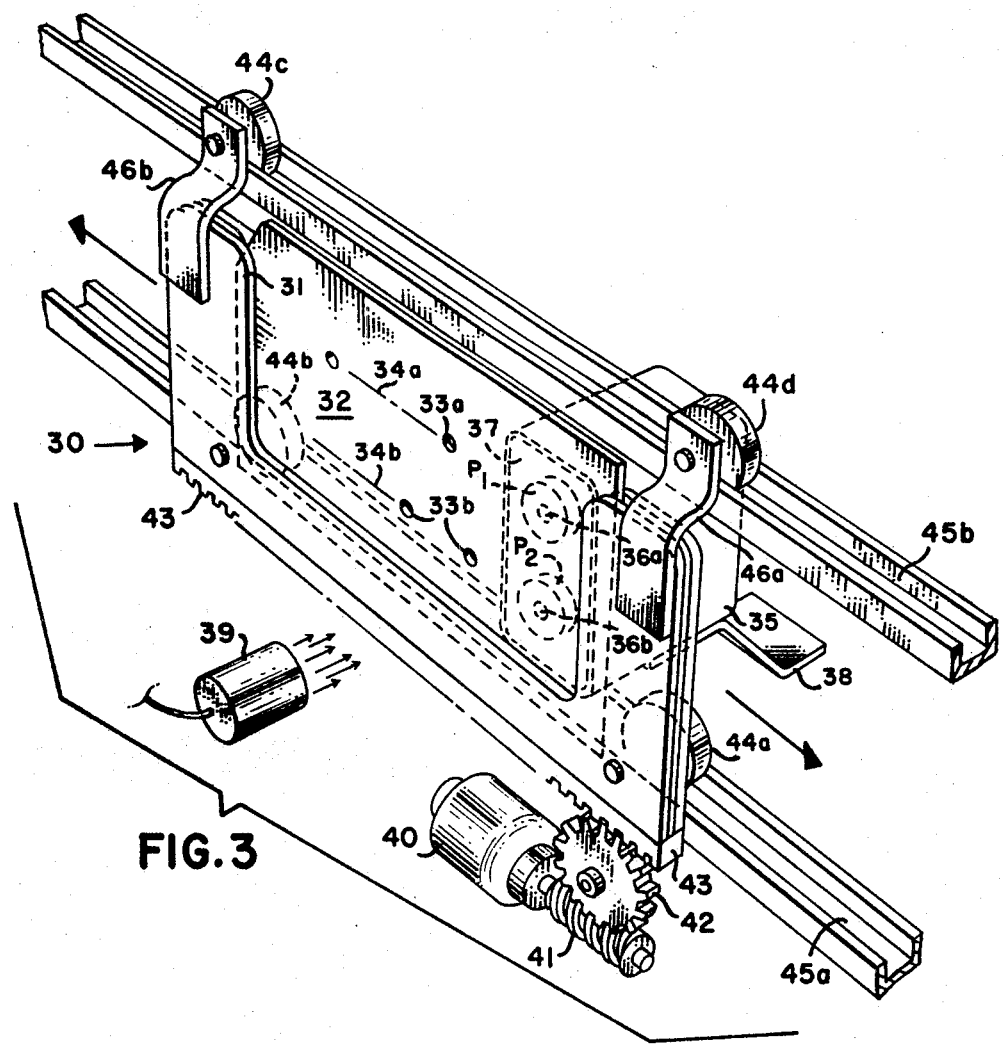
FIG. 3 is a perspective view showing a program card, a light source, a card holder, and driving means included in the visual sequence controller of FIG. 1 and arranged to coact with each other and with the switch actuator circuit of FIG. 2 in the operation of the described embodiment of the audio-visual system of this invention.

Referring now to FIG. 3, there is seen a perspective view showing a program card, a light source, a card holder, and driving means, which together with the switch actuator circuit of FIG. 2, comprise the visual sequence controller shown in block form in FIG. 1. As seen in FIG. 3, card holder 30 has a slit 31 within which a program member such as a card 32 can be inserted and held therein. Card 32 has punched holes 33a which form apertures at selected positions along one line 34a thereof, and has punched holes 33b which form apertures at other selected positions along another line 34b thereof. A housing enclosure 35 contains photocells $P_1$ and $P_2$ seen in FIG. 2, which are mounted in housing enclosure 35 to receive light through openings 36a and 36b in face plate 37 of housing enclosure 35. Housing enclosure 35 is held in position by support member 38 so that face plate 37 of housing enclosure 35 is close to card 32 in card holder 30 on one side thereof. On the other side, a light source 39 is fixedly positioned to direct light at card 32. In order to form driving means to move card 32 with respect to light source 39, an electric motor 40 is connected by a gear reduction drive 41 to gear 42 which engages a rack 43 extending along the length of card holder 30. Two freely moving roller guides 44a and 44b are attached near the bottom of card holder 30 to be guided by a channel 45a, and two freely moving roller guides 44c and 44d are attached to card holder 30 by support brackets 46a and 46b respectively, to extend over the top of housing enclosure 35 to be guided by channel 45b.

In operation, the above described audio-visual system of this invention, an instructor would first arrange to have holes punched in selected positions along lines 34a and 34b of card 32. To do so, after preparing a program of lectures correlated with slides and motion pictures, an operator would set up tape recorder 12, slide projector 13, movie projector 15 and visual controller 16 in their start conditions. Upon turning on main switch 17, tape recorder 12, and slide projector 13 will begin to operate. At the same time, motor 40 will begin to rotate gear 42 to slowly move card holder 30 from its beginning position along the length of rack 43. The lecture for the slide shown is then recorded on one track of the tape in tape recorder 12. If desired, several consecutive slides may be shown, by virtue of the slide changing mechanism incorporated in slide projector 13 which is actuated by pulses recorded on another track of the tape in tape recorder 12. Now, when the instructor or lecturer desires to show a portion of the moving picture, main switch 17 is turned off. Card 32 is removed from card holder 30 and a hole is punched on line 34a thereof to enable light from light source 39 to pass through card 32 into opening 36a at that selected position of card holder 30. Then, main switch 17 is turned on, and with light passing through said punched hole, coil $C_1$ will be energized and remain so as above described to connect movie projector 15 to operate. The correlating lecture for the moving picture is then recorded on the tape in tape recorder 12. At the end of this period, main switch 17 is turned off to enable card 32 to be removed and a hole punched on line 34b thereof. The hole is punched on line 34b to enable light from light source 39 to pass into opening 36b at that selected position of card holder 30. Then, main switch 17 is turned on, and coil $C_2$ will again connect slide projector 13 to power line 11 for operation thereof. The above procedure is continued until completed, i.e. holes 33a and 33b are alternately punched on lines 34a and 34b of card 32 at these selected positions for changing the audio-visual system to show still pictures or moving pictures.

Thereafter, this audio-visual system can be reset to the starting conditions. Then, when main switch 17 is turned on, the complete program will be automatically repeated without interruption. With motor 40 driving card holder 30, light from light source 39 will scan card 32, and tape recorder 12 will play back the recorded lectures for either the slides or moving pictures being shown on the screen. At the time when the changeover is to occur from slide projector operation to that of movie projector operation, light will pass through a punched hole on line 34a in card 32 and through opening 36a to activate photocell $P_1$. Thereupon, current will flow through transistor $Q_1$ to energize coil $C_1$ of relay $R_1$ which will switch on movie projector 15. At the time when the changeover is to occur from movie projector to slide projector, light will pass through a punched hole on line 34b in card 32 and through opening 36b to activate photocell $P_2$. Thereupon, current will flow through transistor $Q_2$ to energize coil $C_2$ of relay $R_2$ to disconnect coil $C_1$ as above described, which will switch on slide projector 13. Accordingly, the recorded audio-visual program will be automatically repeated without interruption, and with the audio lectures correlated to the visual equipment operation. It will be realized that this prearranged audio-visual program can thereafter be repeatedly reproduced as many times as desired.

Figure 4:
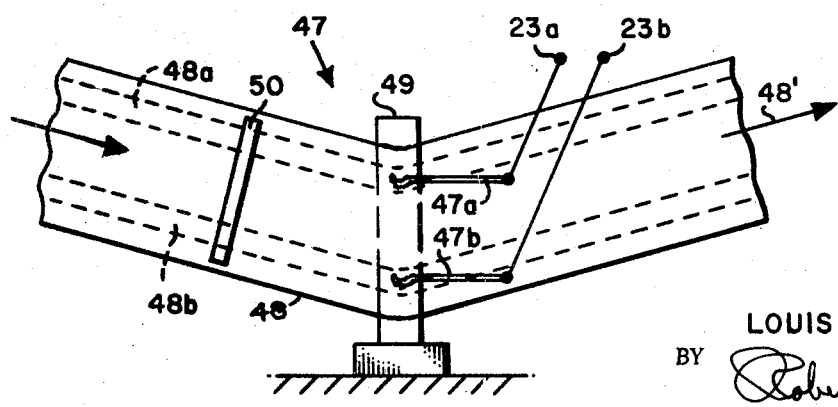
FIG. 4 is a view showing a portion of magnetic tape being guided in the tape recorder of FIG. 1, and illustrating a sync switch used therewith in order to synchronize the timing of said switch actuator circuit with the tape recorder.

When repeating the prearranged audio-visual program, it is possible that the tape recorder 12, card holder 30, movie projector 15, and slide projector 13 may not be accurately repositioned to their starting positions. Then too, it is possible that the holes in card 32 may not be punched in the exact location desired. As a result, the reproduced audio will not be perfectly synchronized with the visual displays of the projectors. Although perfect synchronization is not needed for the slide projectors, means for correcting such misalignments are desirable for the moving picture projector. For this purpose, shorting switch 23 of FIG. 2 is opened and its connecting terminals 23a and 23b are connected to a sync switch 47 for accurately synchronizing movie projector 15 with tape recorder 12. Referring now to FIG. 4, there is seen a portion of magnetic tape 48 being guided in the direction of arrow 48' within tape recorder 12, and showing sync switch 47 operating therewith. Magnetic tape 48 is seen to have two recorded tracks 48a and 48b on one side thereof, and is guided by member 49 from a supply reel to a takeup reel (not shown). Several thin electrically conducting strips, such as strip 50, are adhered to the other side of magnetic tape 48, said strips are located at the precise positions of changeover from slide projector operation to that of movie projector operation. Contacting arms 47a and 47b, being electrically connected to terminals 23a and 23b, are shorted whenever an electrically conducting strip such as strip 50 contacts arms 47a and 47b. As transistor $Q_1$ will only conduct to energize coil $C_1$ of relay $R_1$ when sync switch 47 is closed, then sync switch 47 functions to accurately time the changeover to movie projector operation. Accordingly, sync switch 47 in conjunction with the conducting strips such as strip 50 serves to provide synchronization timing means to allow the switch actuator circuit of FIG. 2 to operate when sync switch 47 is closed.

From the above, it will be realized that the audio visual system of this invention enables the automatic coordinated operation of audio and visual reproducing devices of types that are readily or conveniently available. The system of this invention enables a skilled instructor to quickly and easily record his developed audio-visual program on a program card member, and this program can then be reproduced by personnel who are able to set up and operate the audio and visual reproducing equipment.

Having herein described the invention, what is claimed as new is:

1. An audio-visual system comprising:
   an audio reproducing device;
   a pair of visual reproducing devices;
   a visual sequence controller including
      a program member having two lines of aligned apertures, each line of apertures being spaced from each other in a predetermined arrangement,
      a light source,
      driving means to move the program member at a constant rate with respect to the light source to enable the light from said light source to scan the program member, and
      a switch actuator circuit with a pair of photocells, each photocell being positioned to receive the light from said light source passing through the apertures on one line of the program member; and
   switch means connected to said visual reproducing devices, said switch means being responsive to the switch actuator circuit to operably connect one of said visual reproducing devices when light passes through an aperture on one line of the program member, and to operably connect the other of said visual reproducing devices when light passes through an aperture on the other line of the program member.

2. An audio-visual system comprising:
   an audio reproducing device;
   a pair of visual reproducing devices;
   a visual sequence controller including
      a program member having two lines of aligned apertures, each line of apertures being spaced from each other in a predetermined arrangement,
      a light source,
      driving means to move the program member with respect to the light source to enable the light from said light source to scan the program member, and
      a switch actuator circuit including a pair of fixedly positioned photocells to receive light passing through the apertures of the program member, and including a first relay having a coil which is energized to actuate said first relay when light passes through apertures on one line of the program member, and including a second relay having a coil which is energized to actuate said second relay when light passes through the apertures on the other line of the program member, one relay remaining actuated until the other relay is actuated; and
   switch means connected to said visual reproducing devices, said switch means being responsive to the switch actuator circuit to operably connect one of said visual reproducing devices when said first relay is actuated, and to operably connect the other of said visual reproducing devices when said second relay is actuated.

3. An audio-visual system comprising:
   an audio reproducing device;
   a pair of visual reproducing devices;
   a visual sequence controller including
      a program card having two lines of aligned changeover apertures, each line of apertures being spaced from each other in a predetermined arrangement,
      a fixedly positioned light source;
      driving means to move the program card with respect to the light source to enable the light from said light source to scan the program card, said driving means including a card holder with a slot therein for holding said program card, and motor means to linearly move said card holder, and a switch actuator circuit including a pair of fixedly positioned photocells to receive light passing through the apertures of the program card, and including a first relay having a coil which is energized to actuate said first relay when light passes through apertures on one line of the program card, and including a second relay having a coil which is energized to actuate said second relay when light passes through the apertures on the other line of the program card, said first relay remaining actuated until said second relay is actuated;
   and switch means connected to said visual reproducing devices, said switch means being responsive to the switch actuator circuit to operably connect one of said visual reproducing devices when said first relay is actuated, and to operably connect the other of said visual reproducing devices when said second relay is actuated.

4. The system defined in claim 1 which additionally includes synchronization timing means having a sync switch connected to said audio reproducing device to be switched on at selected times during the operation of the audio reproducing device, said sync switch being connected to said switch actuator circuit to allow the switch actuator circuit to operate when the sync switch is closed.

5. The system defined in claim 2 which additionally includes synchronization timing means having a sync switch connected to said audio reproducing device to be switched on at selected times during the operation of the audio reproducting device, said sync switch being connected to said switch actuator circuit to allow the switch actuator circuit to operate when the sync switch is closed.

6. The system defined in claim 3 which additionally includes synchronization timing means having a sync switch connected to said audio reproducing device to be switched on at selected times during the operation of the audio reproducing device, said sync switch being connected to said switch actuator circuit to allow the switch actuator circuit to operate to actuate said first relay when the sync switch is closed.

7. An audio-visual system comprising:
an audio reproducing device;
a pair of visual reproducing devices;
a visual sequence controller including
    a program member having two lines of aligned apertures, each line of apertures being spaced from each other in a predetermined arrangement,
    a light source,
    driving means to move the program member at a constant rate with respect to the light source, and
    a switch actuator circuit with a pair of photocells, each photocell being positioned to receive the light passing through the apertures on one line of the program member; and
switch means connected to said visual reproducing devices, said switch means being responsive to the switch actuator circuit to operably connect one or the other of said visual reproducing devices when light passes through an aperture on one or the other lines of the program member.

References Cited

UNITED STATES PATENTS 2,905,048   9/1959   Miller.
3,374,723   3/1968   Baumbach.

FOREIGN PATENTS 347,155   10/1929   Great Britain.

JULIA E. COINER, Primary Examiner

U.S. Cl. X.R.

352—7, 9, 92